United States Patent [19]
Bartek et al.

[11] Patent Number: 5,638,517
[45] Date of Patent: Jun. 10, 1997

[54] METHOD AND APPARATUS FOR TRANSMITTING A MESSAGE FROM A COMPUTER SYSTEM OVER A NETWORK ADAPTER TO THE NETWORK BY PERFORMING FORMAT CONVERSION AND MEMORY VERIFICATION

[75] Inventors: Brice A. Bartek; Michael S. McIntyre; Charles A. Musta, all of Austin, Tex.

[73] Assignee: International Business Machines Corp., Armonk, N.Y.

[21] Appl. No.: 479,244

[22] Filed: Jun. 7, 1995

Related U.S. Application Data

[63] Continuation of Ser. No. 930,584, Aug. 14, 1992, abandoned.

[51] Int. Cl.$^6$ ............................................. G06F 13/00
[52] U.S. Cl. ........................ 395/200.18; 395/200.2; 395/837
[58] Field of Search ........................... 395/700, 650, 395/500, 275; 370/85.1, 85.4, 85

[56] References Cited

U.S. PATENT DOCUMENTS

| | | | |
|---|---|---|---|
| 4,649,479 | 3/1987 | Advani et al. | 395/700 |
| 4,701,848 | 10/1987 | Clyde | 364/200 |
| 4,754,395 | 6/1988 | Weisshaar et al. | 364/200 |
| 4,823,338 | 4/1989 | Chan et al. | 370/85 |
| 4,930,121 | 5/1990 | Shiobara | 370/85.4 |
| 4,975,905 | 12/1990 | Mann et al. | 370/85.1 |
| 5,058,108 | 10/1991 | Mann et al. | 370/85.1 |
| 5,214,761 | 5/1993 | Barret et al. | 395/275 |
| 5,265,252 | 11/1993 | Rawson, III et al. | 395/700 |

FOREIGN PATENT DOCUMENTS

| | | |
|---|---|---|
| 0186007A2 | 7/1986 | European Pat. Off. |
| 0543610A2 | 5/1993 | European Pat. Off. |

*Primary Examiner*—Thomas C. Lee
*Assistant Examiner*—Duo Chen
*Attorney, Agent, or Firm*—Jeffrey S. LaBaw

[57] ABSTRACT

In a computer network having a plurality of nodes with one or more computer systems associated with a node a method for transmitting messages to and from a DOS application resident in a memory to and from the network. The messages to and from the DOS application are handled a virtual device driver resident in the memory which is monitoring the 5C interrupt. The virtual device driver converts an outgoing CCB1 message from the DOS application to a message in a CCB3 32-bit format and an incoming 32-bit CCB3 message to a CCB1 format. The virtual device driver transmits the CCB3 message to a physical device driver resident in system memory. The physical device converts messages between the CCB3 32-bit format and a CCB3 16-bit format. The physical device driver transmits and receives 16-bit CCB3 messages to and from a logical link control protocol driver resident in the memory. The logical link control protocol driver is preferably written to the ISO 8802-2 standards and passes and receives messages to and from the MAC layer and the LAN adapter. With an incoming message the virtual device driver arms a context hook which fires when the operating system has allocated sufficient memory to the DOS application resident Virtual 86 mode before transmitting the CCB1 message to the DOS application.

16 Claims, 15 Drawing Sheets

DATA STRUCTURE FOR LTSVCFG TOOL

| CONTROL BLOCK OFFSET | FIELD DESCRIPTION | FIELD VALUE |
|---|---|---|
| 0 | COMMAND CODE | X 'FA' |
| 1 | ERROR FLAG | 00 OR 01 |
| 2 | SEND NO ACK SUPPORT | 00 OR 01 |
| 3 | FILLER | 00 |
| 4 | 5 X 16 MATRIX | DEFAULTS INITIALLY |

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 6 | 6 | 6 | 6 | 6 | 6 | 6 | 6 | 6 | 6 | 6 | 6 | 6 | 6 | 6 | 6 |
| 12 | 12 | 12 | 12 | 12 | 12 | 12 | 12 | 12 | 12 | 12 | 12 | 12 | 12 | 12 | 12 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

S - SESSIONS
C - COMMANDS
N - NAMES
A - SEND NO. ACK SUPPORT
D - DIRECT STATION SUPPORT

FIG. 5

→ 802 ASYNCHRONOUS COMPLETION PROCESSING ON HARDWARE INTERRUPT

THIS IS THE SEQUENCE WHEN THE MVDM CALLS THE VDD WHEN A CONTEXT HOOK FIRES BRINGING IN A DOS CONTEXT.

802 ASYNCHRONOUS COMP. PROCESSING CCB EXCEPTION STI HOOK

CCB1 Command Control Block

| OFF-SET | FIELD NAME | BYTE LEN | 8086 TYPE | DESCRIPTION |
|---|---|---|---|---|
| 0 | CCB_ADAPTER | 1 | DB | Adapter 0 or 1 |
| 1 | CCB_COMMAND | 1 | DB | Command field |
| 2 | CCB_RETCODE | 1 | DB | Completion code |
| 3 | CCB_WORK | 1 | DB | Adapter Support Software work area |
| 4 | CCB_POINTER | 4 | DD | Queue pointer and Adapter Support Software work area |
| 8 | CCB_CMD_CMPL | 4 | DD | Command completion user appendage |
| 12 | CCB_PARM_TAB | 4 | -- | Parameters or pointer to CCB parameter table |

Note: The above control block definition is to be used with both the direct interface and the DLC interface.

FIG. 8A

CCB3 Command Control Block

| OFF-SET | FIELD NAME | BYTE LEN | 8086 TYPE | DESCRIPTION |
|---|---|---|---|---|
| 0 | CCB_ADAPTER | 1 | DB | Adapter 0 or 1 |
| 1 | CCB_COMMAND | 1 | DB | Command field |
| 2 | CCB_RETCODE | 1 | DB | Completion code |
| 3 | CCB_WORK | 1 | DB | Adapter Support Software work area |
| 4 | CCB_POINTER | 4 | DD | Queue pointer and Adapter Support Software work area |
| 8 | CCB_APPNDG_OFFSET | 2 | DW | Offset to CCB3 completion appendage |
| | -reserved- | 2 | DW | Reserved for application program |
| 12 | CCB_PARM_OFFSET | 2 | DW | Offset to CCB3 parameter table |
| 14 | CCB_PARAMETER_1 | 2 | DW | Parameter or reserved for an application program |
| 16 | CCB_RESOURCE_ID | 2 | DW | Resource ID of application program process |
| | -reserved- | 2 | DW | Reserved for application program |
| 20 | CCB_APPL_ID | 1 | DB | Application ID |
| 21 | -reserved- | 1 | DB | Reserved for application program |
| 22 | CCB_APPL_KEY | 2 | DW | Application key code |
| 24 | CCB_PARAMETER_2 | 2 | DW | Parameter for System Key or reserved |

Note: The above control block definition is to be used with both the direct interface and the DLC interface.

FIG. 8B

METHOD AND APPARATUS FOR TRANSMITTING A MESSAGE FROM A COMPUTER SYSTEM OVER A NETWORK ADAPTER TO THE NETWORK BY PERFORMING FORMAT CONVERSION AND MEMORY VERIFICATION

This is a continuation of application Ser. No. 07/930,584 now abandoned filed Aug. 14, 1992.

BACKGROUND OF THE INVENTION

This invention relates generally to data processing systems in an interconnected environment. More particularly, it relates to an improved method for transmitting of data in a data processing system from a local area network application written to operate in the real address mode of a processor to a local area network through a virtual device driver and physical device stack written for an operating system which uses both the real address mode and protected address mode of the processor.

It is becoming increasingly prevalent to couple a plurality of data processing systems in an interconnected computing environment such as a Local Area Network (LAN) or Wide Area Network (WAN). The networks are becoming increasingly complicated, with several different LAN networks of different protocols coupled together with the data processing systems from multiple vendors in the network.

To assure that different network technologies can communicate with each other, most vendors provide capability to interface according to the IEEE and International Standard Organization's standards for Local Area Networks. ISO 8802-2 (IEEE Standard 802.2-1989) Logical Link Control Protocol describes the data link layer in a Local Area Network. ISO 8802-3 (IEEE Standard 802.3-1988) describes a bus utilizing CSMA/CD as the access method. ISO 8802-4 (IEEE Standard 802.4-1985) describes a bus utilizing token passing as the access method. ISO 8802-05 (IEEE Standard 802.5-1989) describes a ring utilizing token passing as the access method. ISO 8802-07 describes the ring utilizing a slotted ring as the access method. This family of standards deals with the physical and data link layers as defined by the ISO open systems interconnection reference model.

The operating system of a computer system is responsible for controlling the computer hardware components such as a graphic display, a disk storage device and a printer according to sets of instructions in the system memory and through the agency of a plurality of code modules called device drivers. If a personal computer is coupled to a local area network, it will typically include a LAN adapter, a piece of hardware, and a LAN device driver written compatibly to the ISO and IEEE standards. One of the first widely successful operating systems for a personal computer system was the Personal Computer Disk Operating System, commonly called DOS, which is used for personal computers having a CPU in the Intel 286, 386, 486 lines of microprocessors.

OS/2 2.0 is a vastly superior operating system to DOS, but because of the large base of installed DOS applications which users are unwilling to give up, OS/2 2.0, to be commercially viable, must reliably run the DOS applications. OS/2 2.0 runs DOS programs in a special Virtual 8086 mode of the Intel 386 and 486 processors. The Virtual 8086 mode allows each DOS application to run in its own protected one megabyte of memory space called a Virtual DOS Machine (VDM). While it appears to the DOS application that it is running in DOS, it must use OS/2 resources for any I/O calls to system devices which must be shared among a plurality of concurrently running applications. OS/2 2.0 has introduced the concept of an OS/2 virtual device driver (VDD) to intercept DOS I/O calls which emulates the functions of a particular hardware device. The VDD passes the I/O calls to an OS/2 physical device driver (PDD) which has actual access to the device. The PDD interacts with the device adapter and passes the results to the VDD which in turn passes the results to the DOS application.

In the LAN environment, there is a problem with the VDD/PDD arrangement. An OS/2 VDD is a 32-bit ring zero application that can only interact with an OS/2 PDD which is also a 32-bit application. Currently, the protocol drivers and device drivers which control the LAN adapters are written to the ISO and IEEE standards which call for a 16-bit protocol.

SUMMARY OF THE INVENTION

It is therefore an object of the invention to transmit a message from a DOS application running in the Virtual 8086 mode of OS/2 to the local area network without change to the DOS application code.

This and other objects of the invention are accomplished by using an OS/2 physical device driver as an intermediary between the OS/2 virtual device driver and the IEEE 802.2 protocol driver, rather than the OS/2 physical device driver's normal use as an interface to an actual hardware device. The invention finds use in a computer network having a plurality of nodes with one or more computer systems associated with a node. The method begins when a CCB1 message from a DOS application running in a computer system memory is transmitted to the 5C interrupt. The CCB1 message is captured by a virtual device driver running in the computer system memory which is monitoring the 5C interrupt. The virtual device driver converts the CCB1 message to a message in a CCB3 32-bit format. The virtual device driver transmits the CCB3 message to a physical device driver running in system memory which converts the message in the CCB3 32-bit format to a CCB3 16-bit format. The physical device driver transmits the 16-bit CCB3 message to the logical link control protocol driver running in the computer system memory. The logical link control protocol driver is preferably written to the ISO 8802-2 standards and passes the message down to the MAC layer and the LAN adapter. The method for transmitting a message from the network to a DOS application running in the Virtual 8086 mode in a system memory is similar. First, after a message is received from the network the logical link protocol driver delivers a 16-bit CCB3 message the physical device driver running in the computer system memory. The physical device driver converts the 16-bit CCB3 message to a 32-bit CCB3 message and sends it to the virtual device driver running in the computer system memory. The virtual device driver converts the CCB3 message to a CCB1 message and arms a context hook. The context hook is fired when the operating system has loaded the memory belonging to the DOS application running in Virtual 8086 mode. When the context hook is fired, the virtual device driver transmits the CCB1 message to the DOS application.

BRIEF DESCRIPTION OF THE DRAWINGS

FIG. 5 depicts the data structure for the DOS configuration process depicted in FIGS. 4A-4C.

FIGS. 8A-8B depict the fields in the CCB1 and CCB3 control blocks.

DETAILED DESCRIPTION OF THE DRAWINGS

Figure 1:
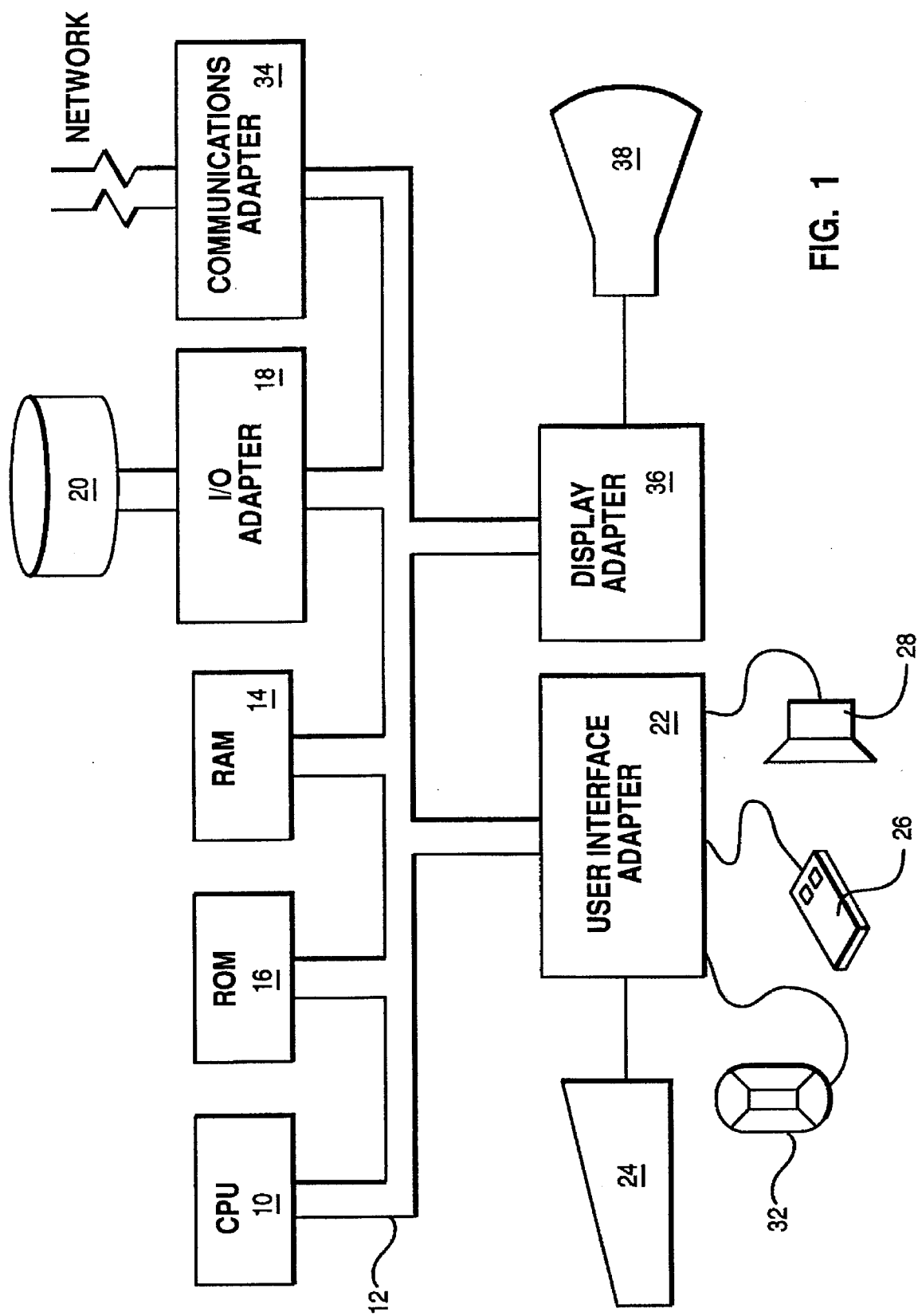
FIG. 1 depicts a typical workstation which would be coupled to a network environment in accordance with the present invention.

A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to display device 38.

The preferred embodiment of the subject invention is an IBM Personal System/2 with the IBM OS/2 operating system installed. Detailed descriptions of the hardware and software environment are provided in PS/2 Hardware Interface Technical Reference, S10G-6457, IBM Corporation (1991), and OS/2 Presentation Manager Programming, SC28-2700, IBM Corporation (1992). While the invention will be described in terms of this hardware and software, one skilled in the art will recognize that other operating systems and hardware can be supported without undue experimentation. Also resident on the computer system is the OS/2 LAN System Software support including the software making up the subject invention. The system software used in the previous release is described in the following publications available from IBM and incorporated herein by reference. IBM Operating System/2 Local Area Network Server Version 2.0 Information and Planning Guide (G236-0162); IBM Local Area Network Server Programs (Specification Sheet) (G360-2753); and IBM Local Area Network Technical Reference (SC30-3383).

Figure 2:
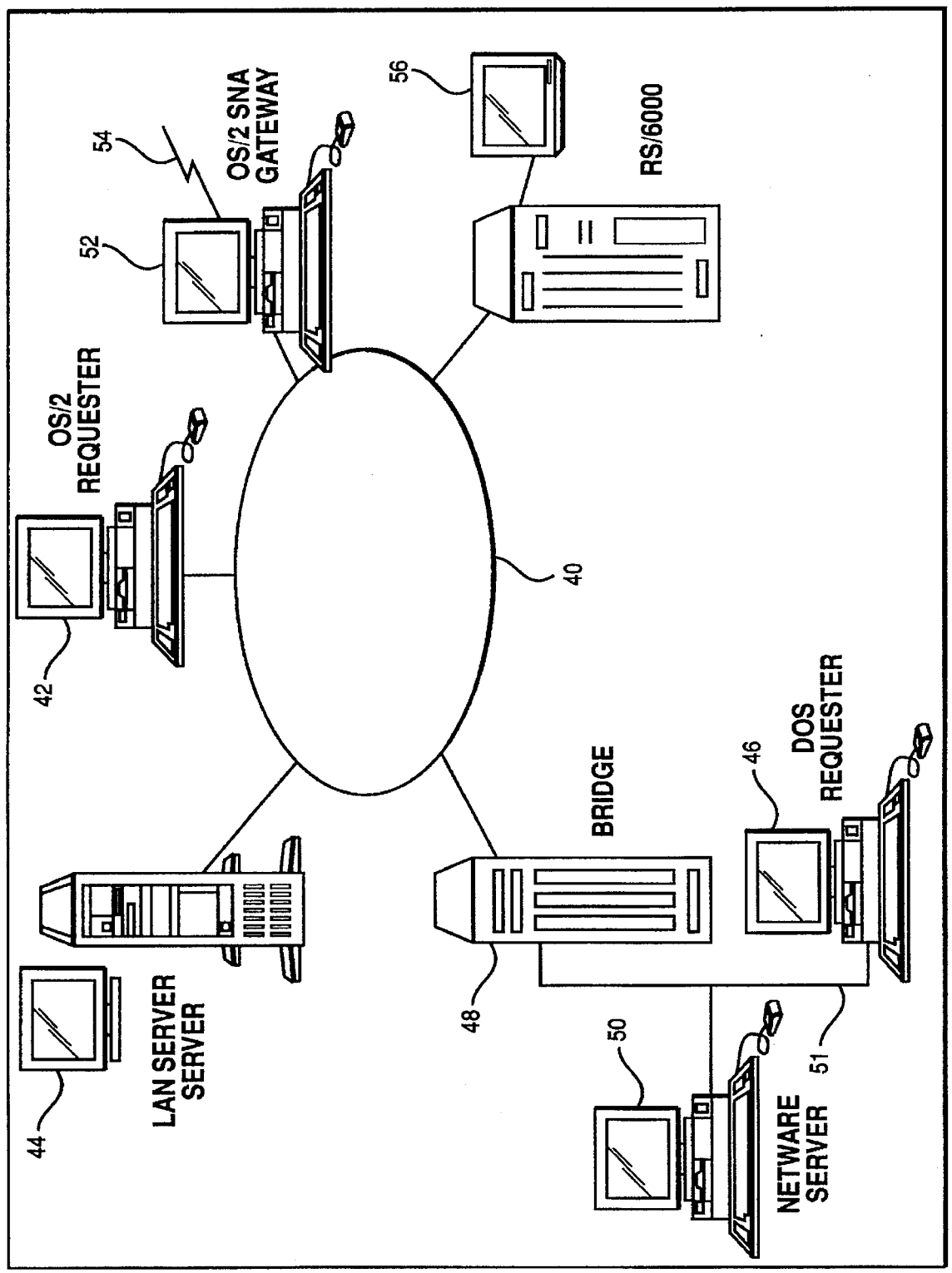
FIG. 2 depicts a plurality of workstations in a network environment according to the present invention.

Interconnected computing environments are becoming much more prevalent. Network environments are becoming more varied, consisting of different LAN technologies, multiple vendors and multiple adapters. There is also a higher performance requirement and a greater need for network management. FIG. 2 is an illustration of a typical computer network environment comprising a plurality of interconnected workstations similar to that shown in FIG. 1.

FIG. 2 illustrates a local area network 40 which is preferably an IBM token ring, however, it could also be an Ethernet or PC net or other LAN type system. OS/2 requester 42 communicates via LAN 40 to LAN Server server 44 for file sharing application server, database server, communications server and other services. The OS/2 Requester 42, as might be suspected, runs on the OS/2 operating system. The DOS Requester 46 communicates by means of Bridge 48 to LAN 40 to request similar services from the LAN Server server 44. Similarly, the DOS Requester 46 runs on the DOS Operating System 5.0. The Bridge 48 is used to couple the DOS Requester 46 and Network Server 50 via Ethernet 51 to the LAN 40. The Netware Server 50 runs on the Novell Netware™ local area network software and provides an example of the level of integration of vendors which is possible in today's local area networks. The OS/2 SNA gateway 52 provides service to the LAN 40 via bus 54 to the other networks which are using the SNA Protocol. Finally, powerful RISC based workstations such as the RISC System/6000 56 can also be coupled to the local area network 40.

Figure 3:
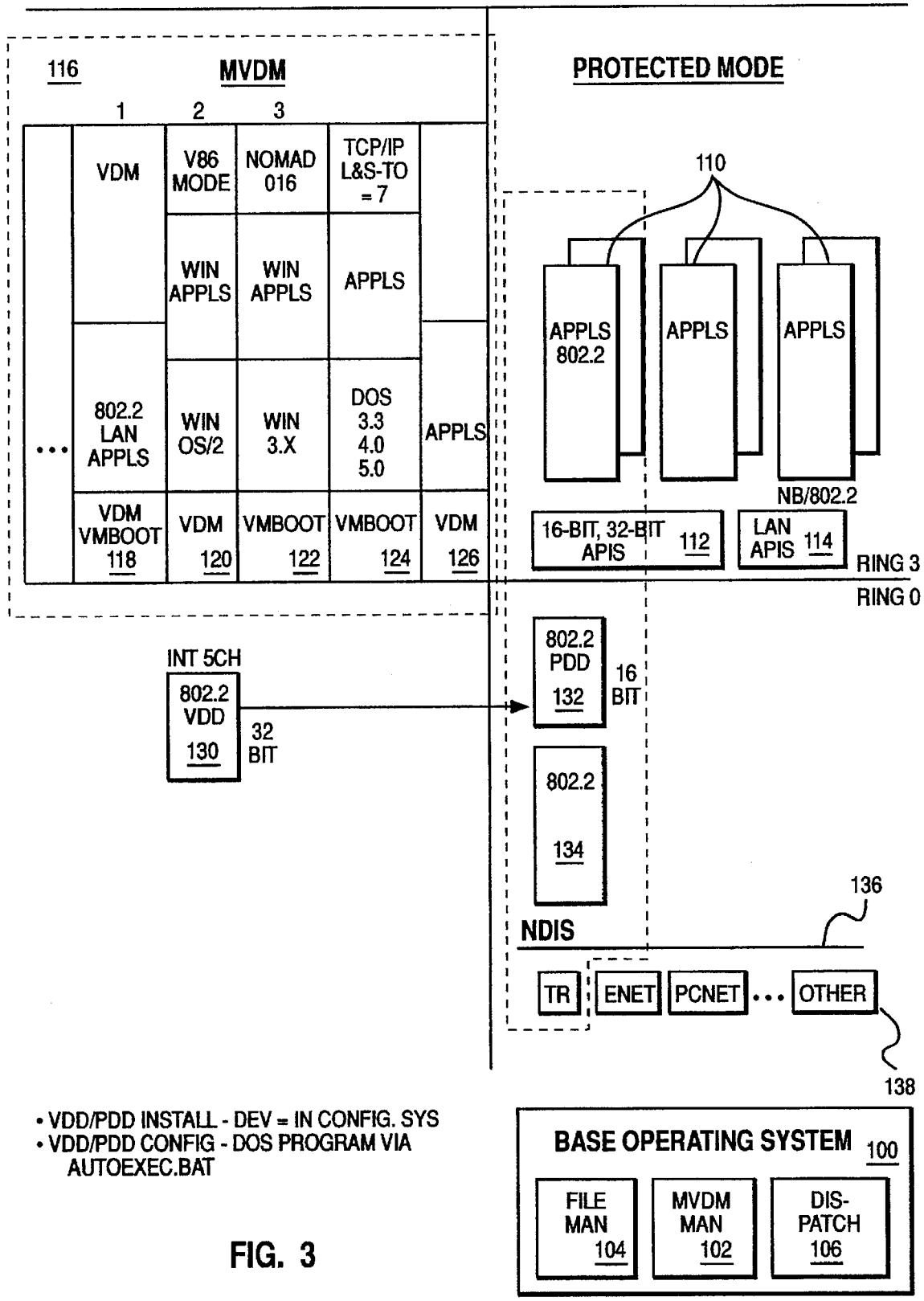
FIG. 3 depicts the code module in the memory of a workstation operating according to the present invention.
Figure 4A:
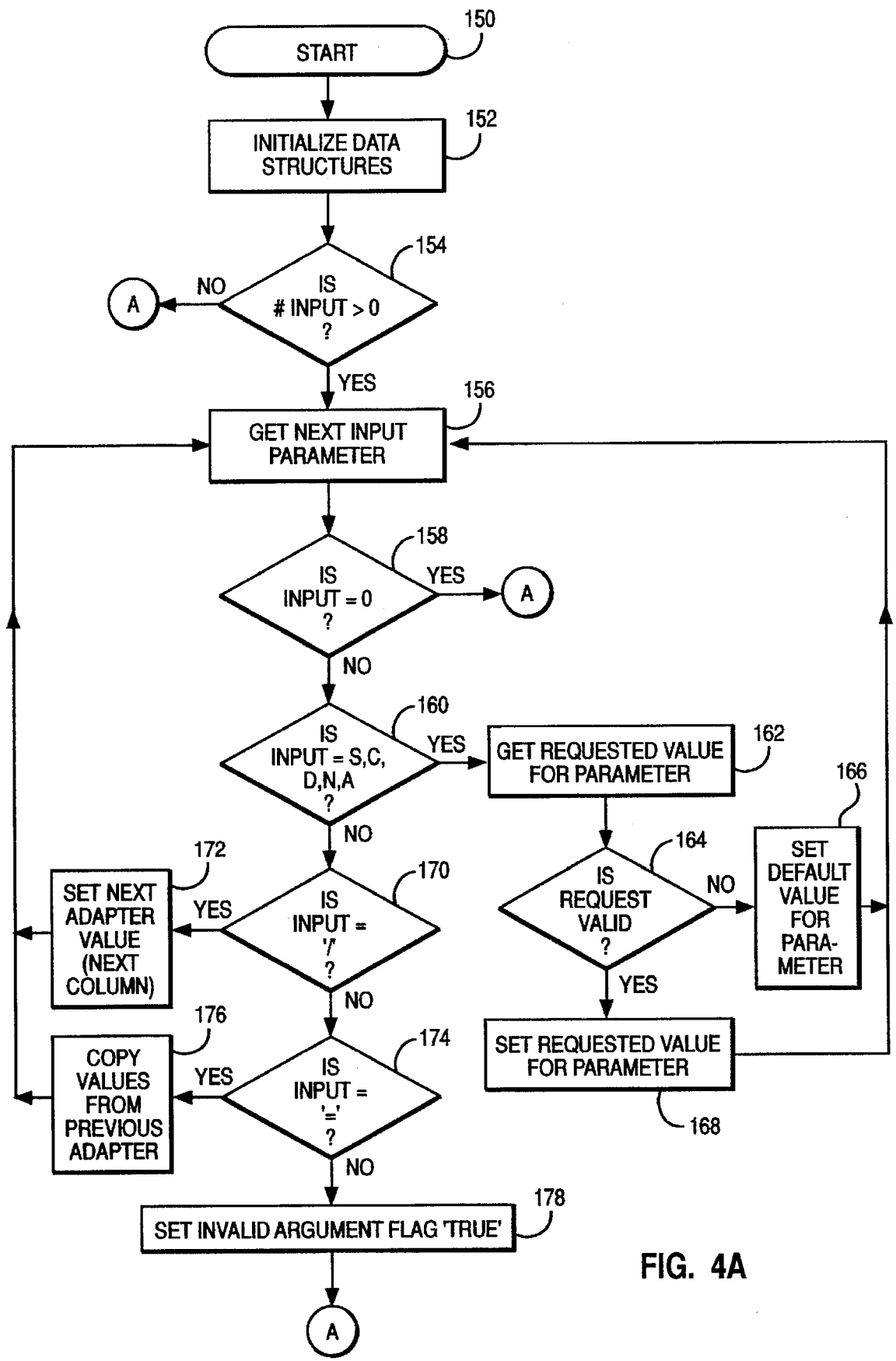
FIGS. 4A-4C are flow diagrams of the configuration process to prepare DOS applications to run within the OS/2 2.0 Virtual DOS machines in accordance with the present invention.
Figure 4B:
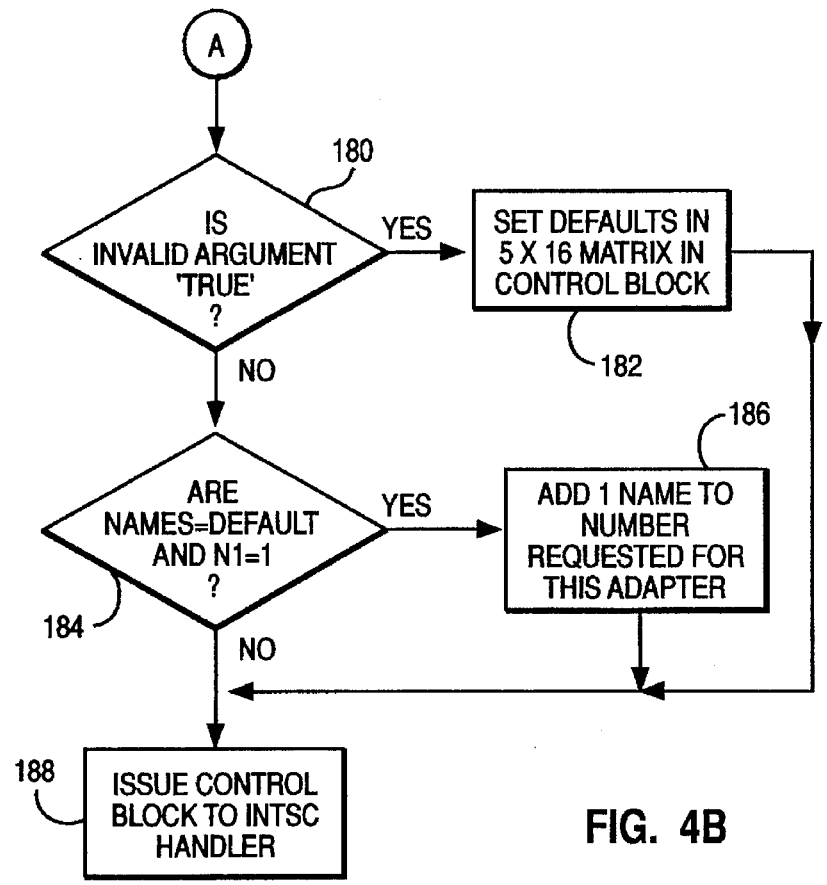
Figure 4C:
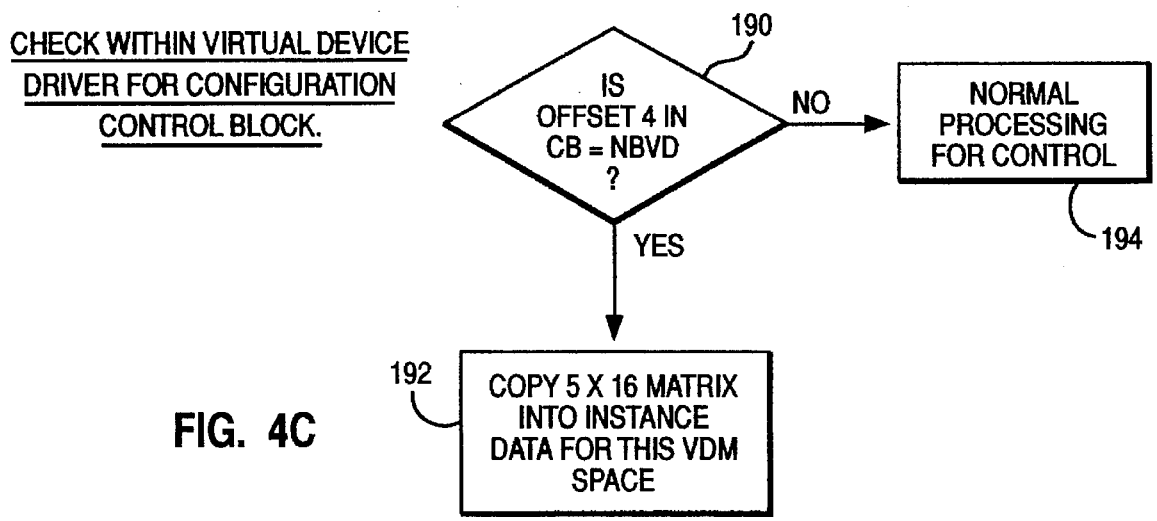

LAN adapter and Protocol Support (LAPS) consists of the network communication software necessary to support LAN connectivity. LAPS is a combination of Network Driver Interface Specification (NDIS) compliant protocol drivers, NDIS compliant network adapter drivers, Application Program Interface (API) support software, and configuration and installation software for the drivers. The IBM Network Basic Input/Output (NETBEUI) has been extended to interface to NDIS and to the 802.2 specification. A complete description of the 802.2 communication standard is available in International Standard (ISO) 8022 (1989). FIG. 3 is a block diagram of the LAN Adapter and Protocol Support for OS/2 2.0.

The CPU within a computer can process information relatively quickly. However, the computer input and output devices are slow. Each of these devices is controlled by a device driver which isolates the rest of the software from the I/O devices. Each device driver is programmed with the physical characteristics of the device.

In the Personal Computer Disk Operating System (PC/DOS) each PC adapter in the personal computer uses a certain interrupt in the interrupt vector table and in the case of a local area network adapter card talking IEEE 802.2 or NETBIOS it is interrupt 5C (Int 5C). The LAN adapter card can be a Token Ring adapter card, it can be PC Net adapter card, it can be an Ethernet adapter card, etc. The Interrupt 5C is used by software applications to interface with the LAN device driver which interfaces to the LAN adapter card. When an application wants to give data to the LAN adapter card to transmit out on the LAN, interrupt 5C is invoked. The application uses a command control block (CCB), for example, a CCB transmit, and within the control block there are one or more pointers to data. If an application wants to send the string "1, 2, 3, 4 and 5", it supplies a pointer in the CMD control block to a data string and invokes interrupt 5C. The computer system gives the data to the LAN adapter card to transmit out on the LAN. Conversely, when data arrives at the PC from the LAN via the LAN adapter card, the LAN device driver looks at the frame, determines the type of frame and gives the data to the application via interrupt 5C. The system refers to the DOS interrupt vector table, gets the address of the device driver which handles the interrupt, makes a control block and transfers control to the device driver's address so that the data can be decoded and processed.

In one example of the prior art in a pure DOS environment the interrupt 5C handling for the LAN adapter was done by an IBM product called LAN Support Program interfaced to the LAN adapter, passed control blocks to the LAN adapter containing data to be transmitted on the LAN and controlled transmission of the data to the remote destination. Data sent out on the LAN and coming in off the LAN is passed via interrupt 5C to the LAN support program which would then in turn give it to the application. The LAN support program can work in an OS/2 2.0 environment, however, since it was coded assuming that it had exclusive use of the LAN adapter, there are no provisions made for sharing the LAN adapter. In other words, no other protocol stack can use the LAN adapter once LAN support program has initialized.

Under OS/2 2.0, virtual device drivers service DOS interrupt requests. This allows a DOS application to run unmodified within OS/2 2.0. There are two different operating modes on which a DOS application may run, Virtual 8086 mode (V86 mode) and a VM Boot mode. When a DOS application runs Virtual 8086 mode, a VDD may allocate normal DOS memory. However, when a DOS application runs in a VM Boot mode, the allocation of normal DOS memory is not allowed by the OS/2 2.0 operating system. Therefore, an alternate mechanism to get the necessary memory allocated for the VDD is needed so that the DOS application's interrupt request can be satisfied.

One preferred method is to include a simple DOS device driver, whose purpose is to allocate DOS memory for use by the VDD. When the DOS driver initializes, it has knowledge of how much memory the VDD needs, this value is the maximum amount of memory that the VDD would need to access in the VM Boot environment. As the DOS driver initializes, it places in its data area address into a command control block (CCB) which it issues to the interrupt 5C which the VDD has taken control. The command code that the DOS device driver places into the CCB is one which signifies to the VDD that the address following is the address of the DOS driver's data area and that its memory is for use by the VDD. Upon receipt of the CCB, the VDD then initializes the memory by inserting its control block signatures.

FIG. 3 depicts a plurality of software modules which would be resident in the random access memory of a workstation operating in accordance with the present invention. As part of the OS/2 2.0 Operating System 100, there is a MVDM manager 102 that manages the multiple virtual DOS machines that run under OS/2 2.0 in the V86 mode. The V86 mode is the emulated DOS mode that OS/2 provides for DOS applications to enable them to run unmodified. Those DOS applications which are accustomed to LAN communications can remain unmodified and as previously described would invoke interrupt 5C, that interrupt 5C vector now contains the address of a virtual device driver 130. When the virtual device driver 130 gets a command control block from one of the applications via the MVDM manager 102, it passes the control block to the 802.2 PDD 132. The 802.2 PDD 132 is a 16-bit OS/2 physical device driver running in the OS/2 protect mode. The PDD 132 in turn passes the control block to the 802.2 protocol driver 134 and the 802.2 protocol stack then services that request, either by transmitting or receiving data across the NDIS interface 136. The applications 110 running in OS/2 protect mode also can share the LAN adapter now that the virtual device driver 130 and physical device driver 132 have enabled the DOS applications to share the adapter. The OS/2 protect mode applications 110 use the 16 and 32 bit API's 112 to issue control blocks. The control blocks are passed directly to the 802.2 protocol drivers 134 which in turn services the API control block request and either transmits or receives data over the network. The LAN technical reference which describes the 802.2 protocol, details the specifics of each command control block that can be issued to the 802.2 protocol stack.

In FIG. A, step 150 is the start of the DOS configuration utility. One preferred embodiment of the DOS configuration utility is a DOS program that is invoked from a DOS command prompt or is part of a .BAT File in DOS. In step 152, a call is made for the initialization of the data structures that will be used in the DOS configuration program and passed to the virtual device driver. The main data structure is the configuration control block which consists of four fields. The first field being at offset 0 in the control block is the command code which is predefined to be "OXFA". The second part of the control block at offset 1 is defined to be the error code indicating to the virtual device driver whether or not an error in input had occurred. The third byte of the control block at offset 2 is the "SEND.NO.ACK flag" which indicates to the virtual device driver whether the SEND.NO.ACK support is being requested from the DOS application. The fourth byte of the structure at offset 3 is a byte filler so that the virtual device driver remains on an even word boundary.

Next, embedded in the control block is a 5X16 array, using five distinct resource request variables and the 16 LAN adapters to support as indexes. The memory for this control block is initialized also in step 152 to the area of memory allocated by the DOS configuration program. Additionally, the adapter number variable which indexes from 0 through 15 for each adapter number is initialized to begin at adapter 0. The first check that is made in the DOS configuration program is for the number of input parameters, in step 15. If the number of input parameters is 0, no input has been provided to the configuration utility and all default values will be used. If input is provided to the DOS configuration utility, step 156, a loop is constructed to process each input parameter individually. Each input parameter is checked to see if it is 0, step 158, meaning that it is the last configuration parameter processed and there are no further parameters to be processed.

If there are no further parameters, the process continues to the issuance of the configuration control block to the interrupt 5C interface. In the next check in step 160, the input is checked across a switch construct with cases for each of the variable resource values, "S" for Sessions, "C" for Commands, "D" for Direct station support, "N" for Names and "A" for SEND.NO.ACK Support. In each case, the switch statement constructs a specific request variable assigning the amount of that resource as requested. Each resource variable is checked against an allowable range for that parameter. If the requested value is outside the allowable range, a flag is set indicating that there has been invalid input into the configuration utility. Since there was invalid input, all the request variables will be set to their default value.

As part of the case statement constructed in step 170, there are two special identifiers provided: the first is a back slash as in step 170 that tells the DOS configuration facility to index to the next adapter value or column in the 5X16 configuration matrix as depicted in FIG. 5. The second identifier is an equal sign that in step 174 tells the DOS configuration utility program to copy the requested variables from the current adapter to the next adapter. If the input parameter does not satisfy the tests in step 160, 170 or 174, it falls through to step 178. Once the invalid argument flag is set to 'TRUE', a comparison is made to that flag in step 180. If the flag is set to true, all defaults will be taken in the 5X16 matrix as shown in FIG. 5. In step 184, a check is made to see if name number one support is requested and the names are equal to the default; if so, one name is added to the amount requested. As name number 1 is itself a name, the user has 17 available names, instead of 16. The process continues in step 188 where the actual configuration control block is issued to the interrupt 5C handler.

Figure 6:
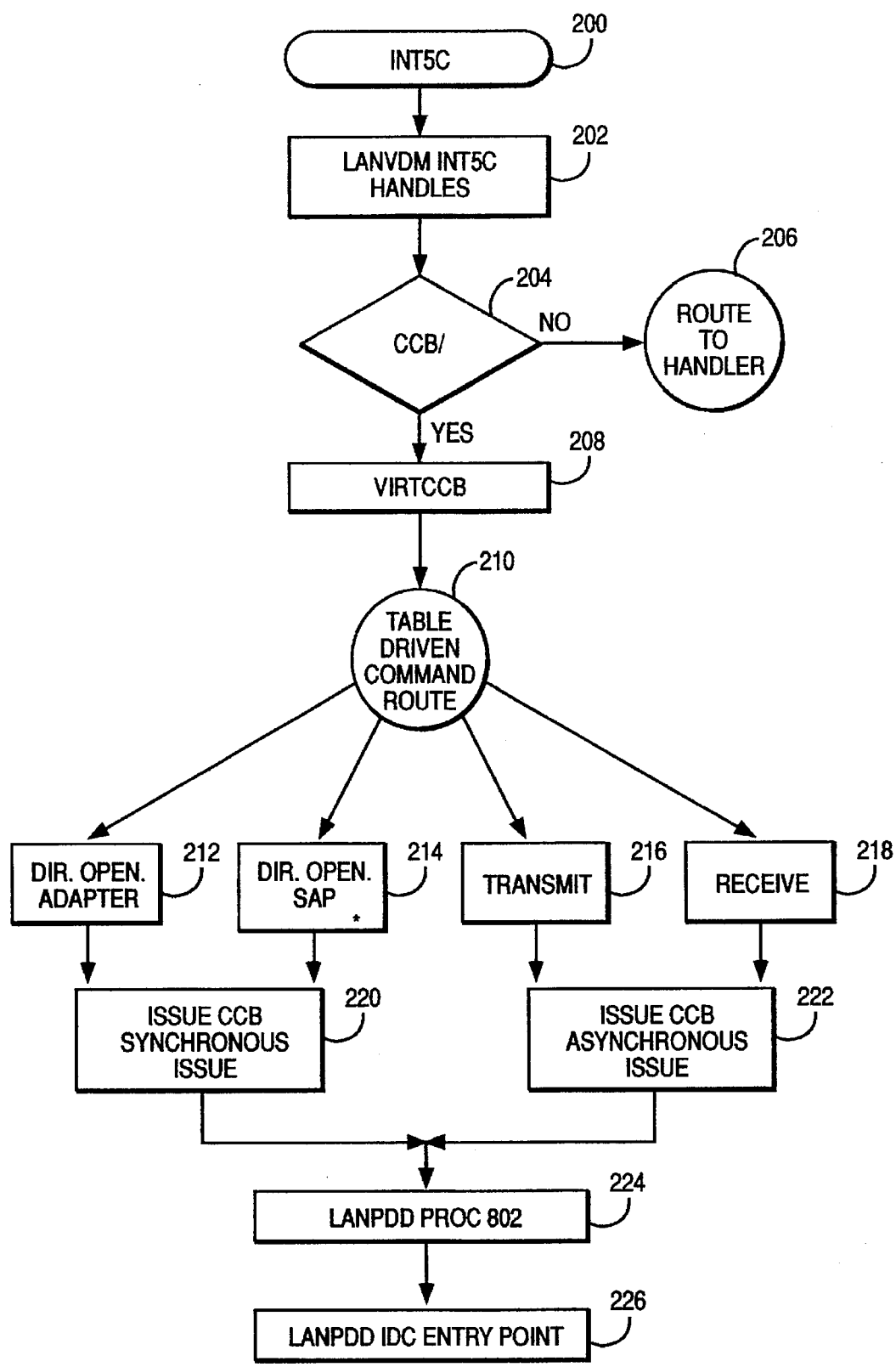
FIG. 6 is a flow diagram for the process of converting an IEEE 802.2 CCB1 control block to an IEEE 802.2 CCB3 control block.

FIG. 6 is a flow diagram of the procedure which captures a CCB1 control block issued from a DOS application, passes it to the 802.2 virtual device driver passing it to the physical device driver and further passing it on to the 802.2 protocol driver. The process starts at step 200 where an interrupt 5C is received from the DOS application. This means that a CCB1 was issued by the DOS application to the interrupt 5C which is being handled by the VDD 802.2 device driver. In step 202, the V86 mode control block address is converted into a linear mode control block address. The linear mode control block address is used by the VDD as it is much easier to manipulate than a V86 mode control block. A test is performed to determine whether the control block is a valid CCB1 control block in step 204. If not, the control block is routed to the error handler in step 206. The error handler will return an error code to the DOS application indicating that the control block sent was not a CCB1 control block. If the control block is a CCB1 control block, in step 208, an initial copy of the CCB1 block is made to the trace buffer.

In step 210, the CCB1 command code is taken from the CCB1 and used as an index into a table of local processing command specific routines. Control is transferred to a specific routine based on the CCB1 command code. In steps 212 through 218, there are four representative commands that are of particular interest to the VDD. There are many other command specific routines which may be addressed in translating a CCB1 control block to a CCB3 control block that will ultimately be sent to the OS/2 802.2 protocol stack. In step 212, direct open adapter is issued by a CCB1 DIR.OPEN.ADAPTER. Three functions that the virtual device driver may need to perform on behalf of the DOS application include setting a group address, setting a functional address and opening the direct station on behalf of the DOS application, if configured. In step 214, the command chosen is DLC open service access point (SAP) where the virtual device driver will create its own SAP buffer pool. One of the key design points of the DLC open SAP is that there are two buffer pools that are managed by the virtual device driver. One buffer pool is the DOS CCB1 buffer pool and the second one is the CCB3 OS/2 SAP buffer pool that the virtual device driver will use when communicating to the OS/2 802.2 protocol driver.

When a transmit CCB1 is issued to the virtual device driver by the DOS application in step 216, the virtual device driver will copy the data to be transmitted into one of its own buffers in order to send that buffer to the 802.2 protocol stack. In step 218, the receive processing follows when a receive command is issued by a DOS application, the virtual device driver will put a receive command to 802.2 OS/2 protocol using buffers that the virtual device driver had constructed during the DLC open SAP processing.

In step 220, CCB3s are issued asynchronously to the OS/2 802.2 protocol driver. In step 222, CCB3s are issued asynchronously to the OS/2 protocol 802.2 stack. The CCB3s that come from steps 220 and 222 are processed in step 224, where the LAN PDD module a 16-bit physical device driver issues them to the 802.2 protocol driver in step 226. The call return model between the VDD and the LAN PDD 224, is a 32-bit call return model. The call return model between LAN PDD and 802.2 protocol driver is a 16-bit call return model. The LAN PDD provides a 32-bit to 16-bit compatibility call return model module.

FIGS. 7A–7F are flow diagrams of the asynchronous completion processing on a hardware interrupt from a local area network communicating back to the DOS application. After the hardware interrupt has passed up through the network adapter and the NDIS layer to the 802.2 protocol driver, the 802.2 protocol driver in step 250 needs to notify the virtual device driver of completion of a hardware interrupt. It does so through the LAN PDD. A LAN DD 16-bit control block is passed by the 802.2 protocol driver to the 802.2 PDD in step 250.

In step 252, the LAN 802.2 PDD will receive one of three events from the 802.2 protocol driver: a CCB3 completion, a received data completion; or, an exception event completion. In step 254, the type field in the CCB3 is set according to the type of event. This event is passed by the PDD where the event is put on a completion queue 256 to be retrieved at a later time. Then a check is made, in step 258, to see if the DOS context hook is already armed, which is to be fired at a later time. The DOS context hook is used to determine whether the specific VDM which will ultimately receive the message is loaded and active in the foreground. If the context hook is armed, control goes back to the operating system to wait for the context hook to fire, in step 259. If the context hook is not armed, the context hook is then armed in step 260 and then control is given back to the operating system in step 259.

Figure 7A:
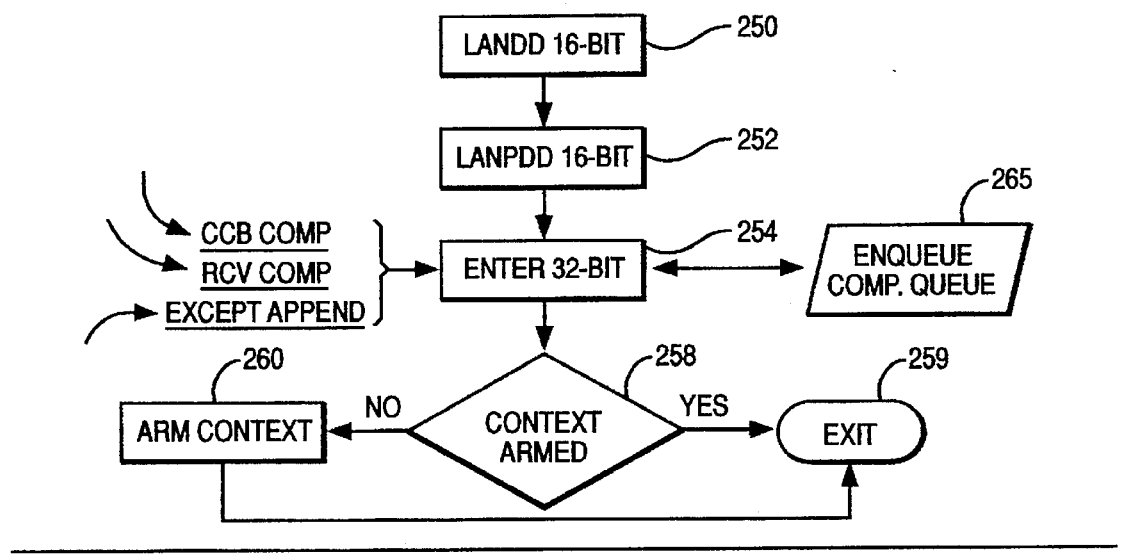
FIGS. 7A-7F are flow diagrams for the process of handling a hardware interrupt at the LAN adapter to a DOS application in accordance to the present invention.
Figure 7A:
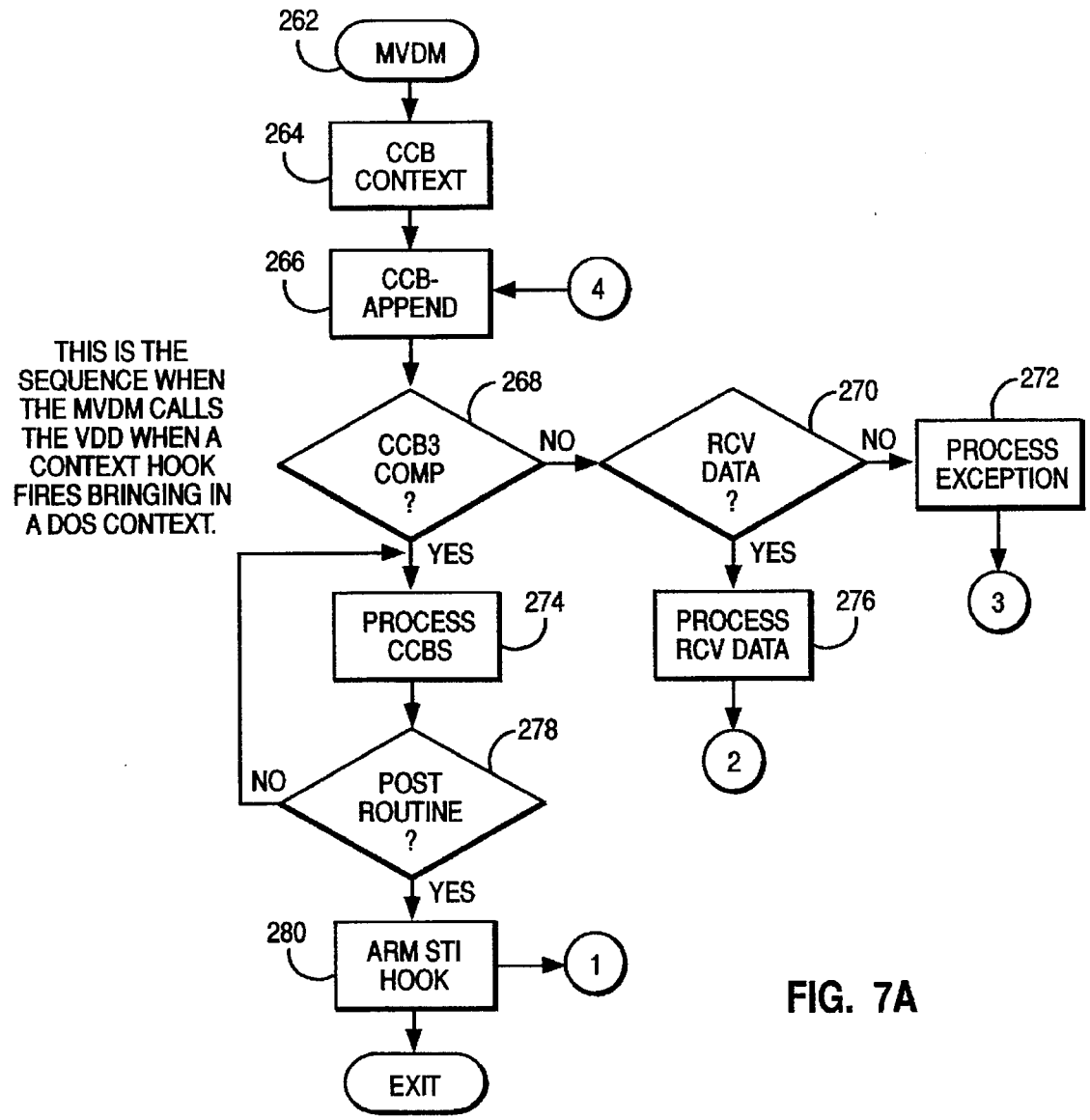

In the second portion of FIG. 7A, the DOS context hook that was armed in step 260 fires indicating that the DOS context is in place. Control is given to the VDD from the MVDM manager in step 262, the VDD control is in CCB context in step 264 and then, in turn, to CCB APPEND in step 266. CCB context is the procedure which gets control after the DOS context hook fires. CCB APPEND is the procedure which processes the completion queue. The event that was placed on the completion queue in step 256 is taken off the queue in step 266 and then examined to determine to which of the three events, in the tests in steps 268, 270 or 272, the event pertains. If the test is positive in step 268, the event taken off the completion queue is a CCB3 completion. The event will proceed to step 274 where the CCB3 will have an associated CCB1 to be completed back to the DOS application. When the CCB1 is sent to the LAN and translated to a CCB3, the segment offset and linear addresses of the CCB1 and CCB3 are kept in a cross-reference field at the end of the CCB3. This information is used when the CCB3 is completed back by the message on the LAN. STI hook is a way for a VDD to get information to a DOS application without interrupting an important part of the DOS application process. If the test in step 278 determines that the application CCB1 has a post routine defined, an STI hook will be armed in step 280 to call the DOS application when interrupts are enabled in the DOS context. If the CCB1 does not have a post routine, control will be returned to step 274 in a loop processing CCBs until all CCBs are exhausted. The type of event received by the PDD determines which test 268, 270 is performed. If it is a receive, step 276 forwards the data to step 316 in FIG. 7D. If it is an exception, step 272 forwards the data to step 334 in FIG. 7E.

Figure 7B:
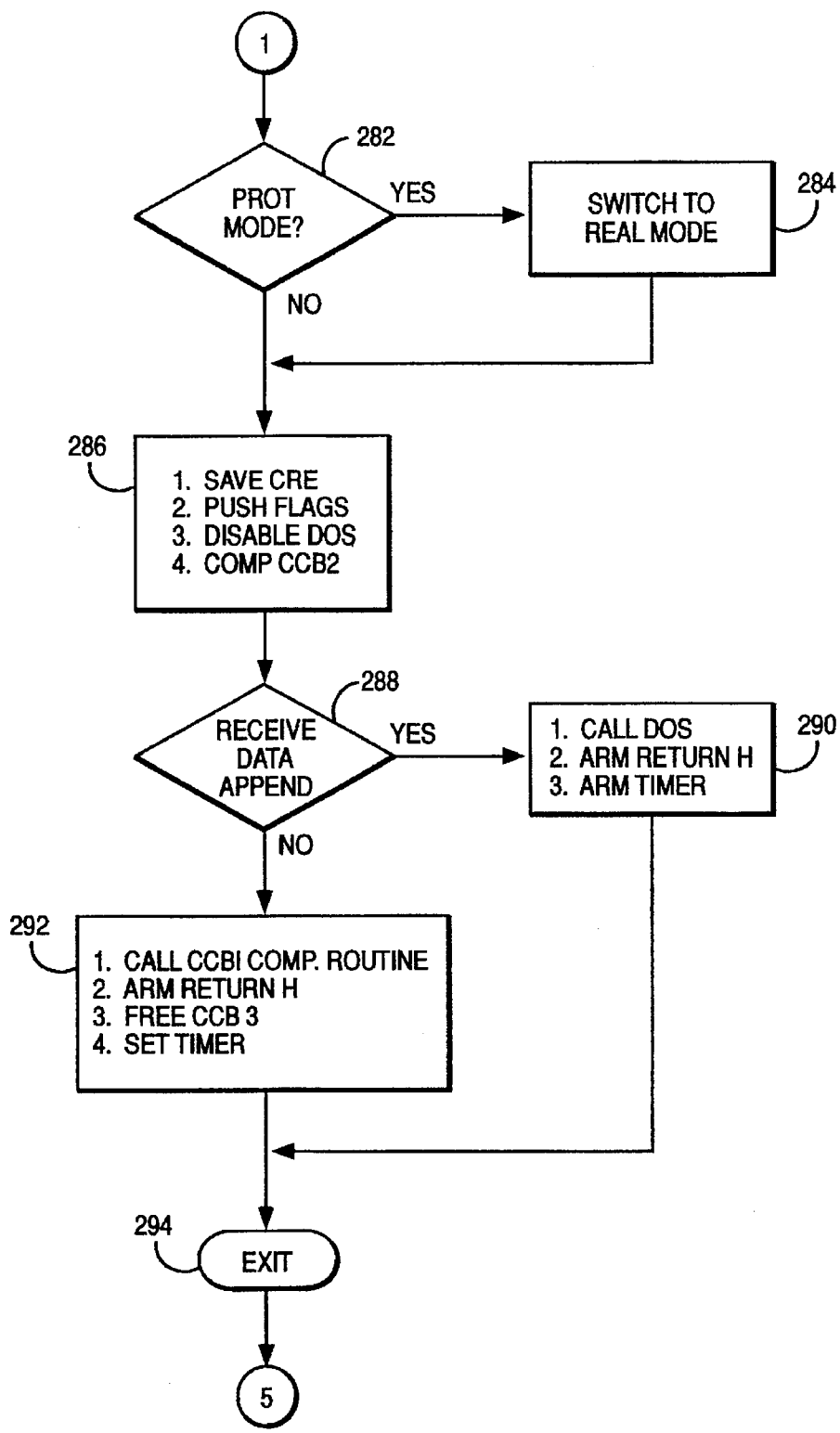

FIG. 7B is a flow diagram which outlines the 802.2 asynchronous completion processing on a CCB STI hook firing. Control is given to the 802.2 virtual device driver as the result of a STI hook firing (meaning that interrupts are enabled in a DOS context), a check in step 282 is made to ensure that the operating system is in protect mode. If the operating system is not in protect mode, the check in step 282 will trigger step 284 which switches to V86 mode.

The process continues on to step 286 where the client register frame (CRF) is saved. Also, in step 286, the DOS flags are saved on the stack that the DOS application is using; the flags are kept in one of the registers of the CRF. The CRF is a structure that contains the values for all the registers in a specific DOS context. DOS interrupts are disabled and the CCB1 is returned. A check is made, in step 288, to see if the command completing is a receive. The virtual device driver has to treat the receive completion differently than other command completions due to the nature of the receive command. The receive stays outstanding forever, so the receive command given to the 802.2 OS/2 protocol driver is not cancelled. If the receive data appendage test is true in step 288, the virtual device driver will call the DOS appendage in step 290, arm a return hook that will give control back to the virtual device driver when the DOS application program does an interrupt return. Also, in step 290, the virtual device driver will arm a timer that will give control back to the virtual device driver after a predetermined period in the event that the DOS application program never executes an interrupt return. If the command completed to the virtual device driver is not a receive data appendage in step 288, the virtual device driver will call the CCB1 completion routine in step 292. Further, in step 192, the VDD will issue a return hook, free the CCB3 control block issued to the OS/2 802.2 protocol driver and set a timer that will give control back to the virtual device driver after a predetermined period in the event that the DOS application program does not perform an interrupt return. Control is then given back to the OS/2 2.0 operating system in step 294, while the process waits for the return hook that was armed in step 292 to fire.

Figure 7C:
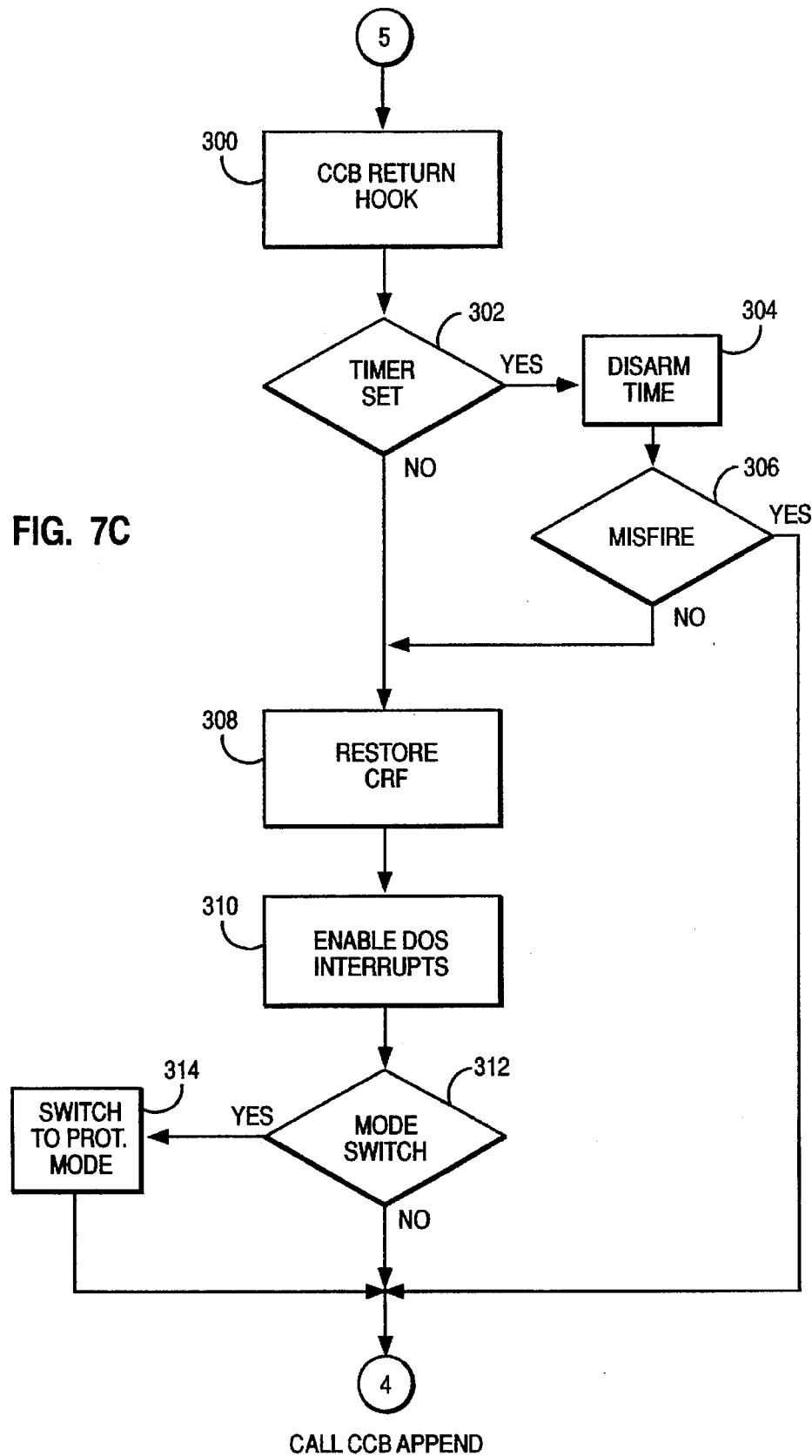

The flow diagram in FIG. 7C depicts the process of CCB return hook processing. Control is given to the virtual device driver, after a CCB return hook fires, by the MVDM manager in step 300. After a specified period of time, a check is made, step 302, to determine if the dead man timer is still armed. If the timer is armed, the timer is disarmed in step 304. A check is performed in step 306 to see if the timer had fired inappropriately. If the timer had fired inappropriately, control is given back to the operating system. If the timer is deemed to have fired correctly, the process proceeds to step 308 where the client register frame that contains the registers of the DOS context are restored to their original values. Interrupts in the DOS environment are enabled in step 310, and then in step 312, a check is made to determine the initial mode of operation, protect mode or Virtual 8086. If protect mode was the initial mode of operation, a switch is made to protect mode in step 314 and then control is given back to the operating system via a call to CCB APPEND.

Figure 7D:
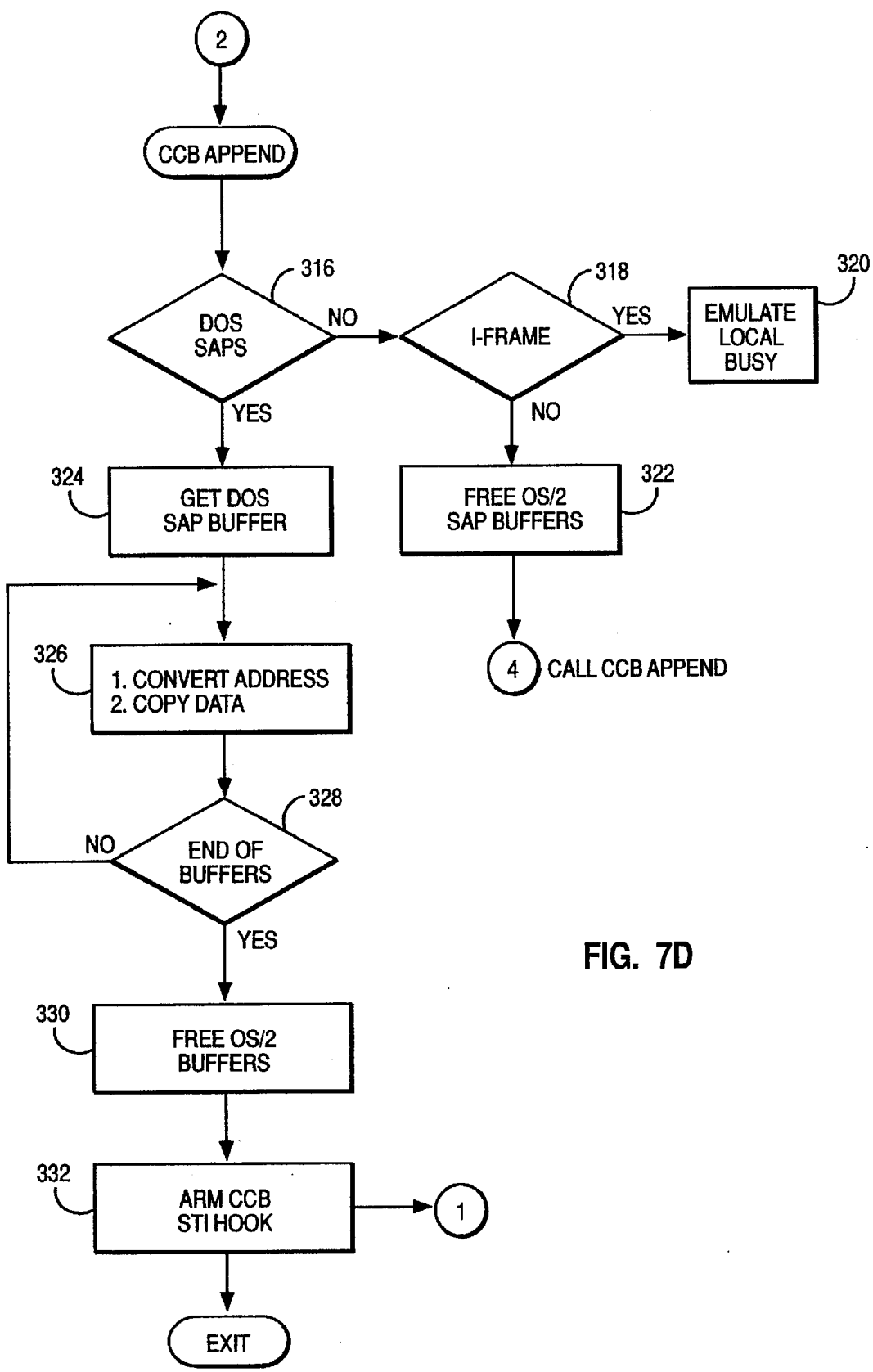

In FIG. 7D, 802.2 asynchronous completion processing for a receive data appendage is depicted. If when the VDD is entered as the result of a CCB context hook firing, the event indicates received data, a check is made to see if the DOS application program has SAP buffers available to hold the arriving data, in step 316. SAP buffers memory that is given the 802.2 API by the DOS application to store data received by the LAN adapter for that application. If the DOS application does not have SAP buffers available, a test is performed to determine whether the frame coming in is an information frame in step 318. If so, the virtual device driver will emulate local busy to the DOS application in step 320. Local busy is a state in the 802.2 protocol to prevent more information being sent to a node than can be stored at the node. If the frame received is not an information frame, the OS/2 SAP buffers containing the data received from the network are freed, in step 322, and a call is made to CCB APPEND.

If the DOS application does have enough DOS SAP buffers to hold the data, the DOS SAP buffers that are managed by the virtual device driver are reserved to contain the data received in the OS/2 SAP buffers in step 324. The data is copied into the DOS SAP buffers from the OS/2 SAP buffers in step 326. A loop is performed copying all data from OS/2 SAP buffers to DOS SAP buffers until the number of DOS SAP buffers is exhausted or the end of the data contained in the OS/2 SAP buffers has been reached, step 328. Once the data is copied into the DOS SAP buffers, the OS/2 SAP buffers are freed back to the OS/2 SAP buffer pool in step 330. The process continues to arm the CCB STI hook, step 332, that will allow the VDD to deliver the DOS SAP buffers back to the DOS application.

Figure 7E:
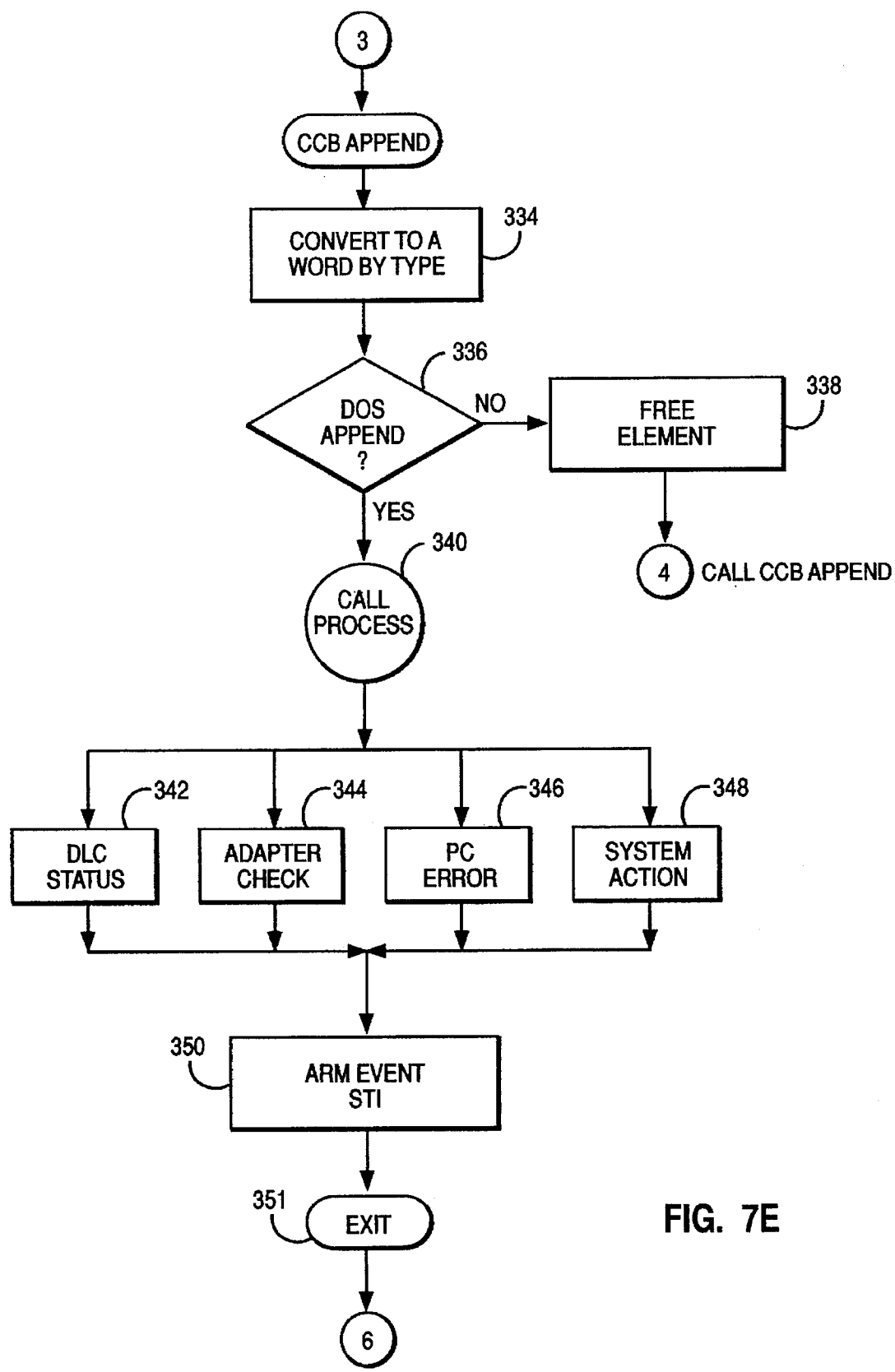
Figure 7F:
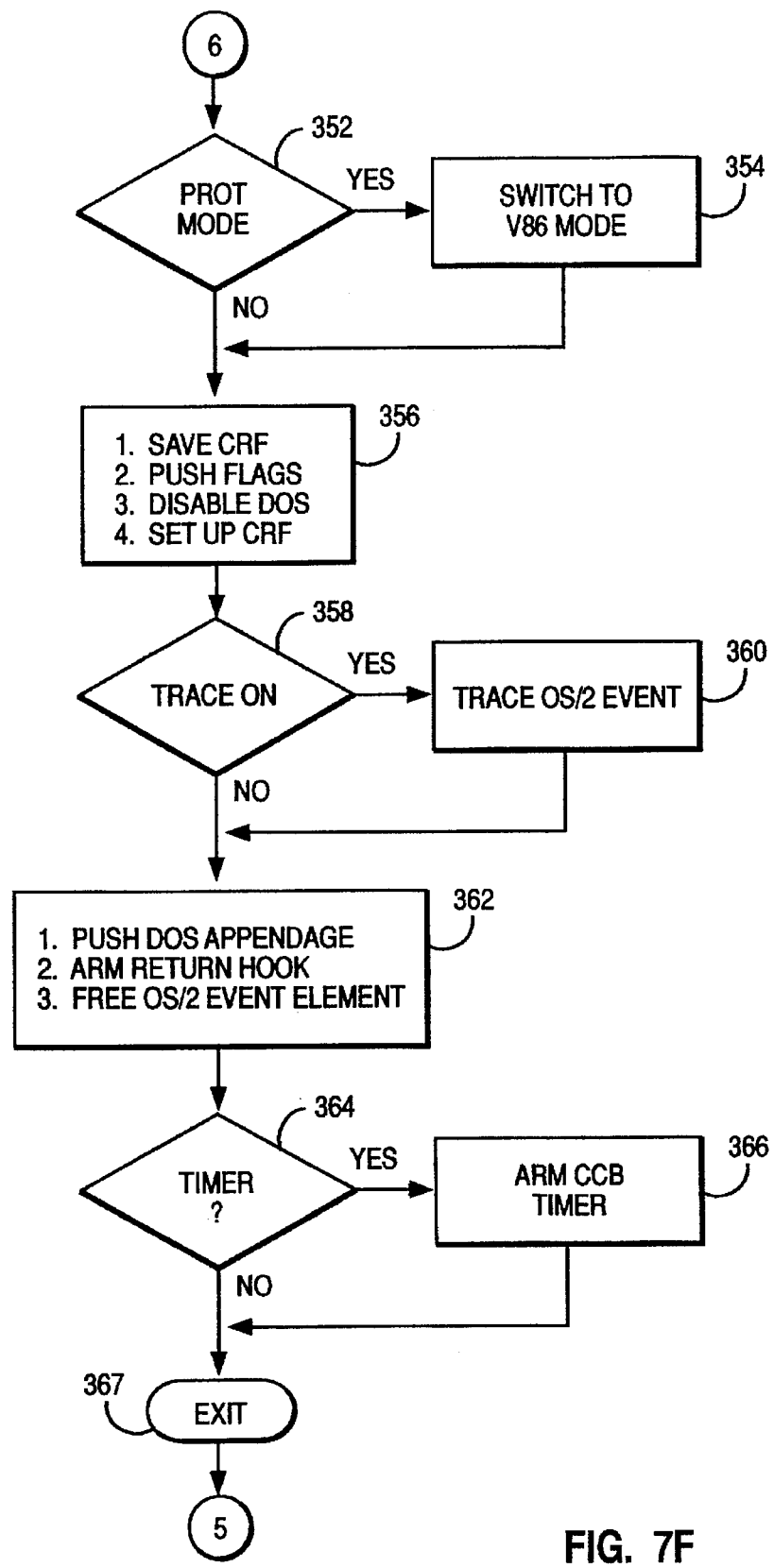

In FIG. 7E, 802.2 asynchronous completion processing for an exception event is depicted by means of a flow diagram. When the MVDM manager calls the virtual device driver due to a context hook firing and the event type indicated is an exception event, the exception event may be one of four types: DLC adapter check; PC error; or, system action. The type of event is found in step 334 by comparing the type code with the four different types of exception events. A check is then made in step 336 to see if the DOS application has requested to be notified on that particular type of status event. If not, in step 338, the element containing the data is put back on the status event free queue in the VDD and a call is made to CCB APPEND. If the DOS application program has requested notification of these events, step 340, a specific routine for each corresponding exception type is called. Exception routines DLC status in step 312, adapter check in step 344, PC error in step 346 and for system action in step 348 are available. In each of these four routines, specific status information is obtained from the element that was passed to the virtual device driver from the 802.2 protocol driver. Once the appropriate exception routine is finished and specific event processing completed, STI hook is then armed, in step 350, to prevent the VDD from entering the DOS application inappropriately, waiting until the STI hook is fired to complete the event back to the DOS application program. Control is then returned to the OS/2 operating system in step 351. The process continues with 802.2 asynchronous command processing for a CCB exception STI hook as depicted in FIG. 7F. A check is made in step 352 to ensure that the operating system is currently in V86 mode. If the operating system is not in V86 mode, a switch to V86 mode, step 354, is made. Once it is determined that the operating system is in V86 mode, step 356, the client register frame is saved. Also in step 356, the flags are also saved on stack, DOS interrupts are disabled and the client register frame is set up for the call to the DOS application program. A check is then made, in step 358, to determine whether traces are requested. If traces are requested, step 360, the event is traced to the OS/2 trace buffer. The process continues to step 362 where the DOS appendage is called, a return hook is armed to return control to the virtual device driver when the DOS application program executes an interrupt return. Also, in step 362, the OS/2 event element that was used to contain the exception event information is freed back to the status event free queue to be reused. A check is then made in step 364 to determine whether or not a CCB time out timer should be armed. If so, the timer is armed in step 366 and control is returned to the operating system in step 367. If not, control goes back to the operating system in step 367 without arming a timer.

FIGS. 8A–8B portray the CCB1 and CCB3 control blocks which are described in detail in the IBM Local Area Network Technical Reference (SC30-3383). The CCB1 control block is the command control block for the IEEE 802.2 adapter support software, which was provided with the original Token-Ring PC adapter or rather, the Local Area Support Program, both products of the IBM Corporation. The CCB3 is the command control block with a device interface provided with the communications manager of OS/2 Extended Edition 1.1 and higher. The CCB1 and CCB3 command control blocks are illustrated in FIGS. 8A and 8B, respectively. In the specification, when it is possible to discuss a command that might be used by both a CCB1 and a CCB3 interface, it is done by using the term CCB only.

To issue a request to a LAN device driver for the DOS operating system, a DOS network application program assembles a control block containing a command and related information for the LAN adapter. The application then puts the computer system's main memory address of this control block into the extra segment (ES) and base (BX) registers. At this point the DOS application invokes interrupt 5C. The LAN adapter device drivers respond to the 5C interrupt by processing the control block.

Referring to FIG. 8A, the LAN adapter support for a CCB1 for DOS is described. The content of the first field indicates to the LAN device drivers which type of interface the DOS program wishes to use. If the first field contains either a "00" or "01" code, the block is considered to be a CCB and either the direct interface or the DLC interface is being used. If the first field contains a byte greater than "OF" the net BIOS interface is being used, and the control block is to be considered NCB rather than a CCB. The second field indicates the CCB command perform. The third field is a completion code as provided by the LAN adapter device drivers. Field is set to "FF" when the CCB is received, while the field is "FF" the application must not alter the CCB or any associated data. When the LAN adapter completes the command, the LAN device driver set the field to the appropriate completion code, such as "00" means successful completion. The fourth field defines a work area field for the LAN adapter device drivers to use. The fifth field is used by the application program to find the next command in the queue of outstanding commands or a queue of commands. The sixth field CCB_CMB CMPL is the address of the user APPENDAGE that the LAN adapter device drivers will go to upon command completion. When the APPENDAGE receives control at this point the address of the CCB that was completed will be in registers ES and BX and the CCB_RETCODE will be in register AL. The seventh field CCP_PARM_TAB points to additional command specific parameters.

To request a device driver interface by CCB3, the application program device driver must place the address of the CCB3 to be executed by the device driver interface into registers ES and BX and push an indication code of "0000" onto the OS/2 stack. The application program device driver then issues a far call instruction to the OS/2 Extended Edition device driver interface intercommunication entry point. At the return from the device driver interface all registers will contain their original values, with the exception of the AX register, which will contain the immediate return code. When a given application program device driver makes a request to the device driver interface it sets the BX register to the address offset of the CCB3 to be executed, the ES register to the address selector of the CCB3 to be executed and pushes an indication code as 0 on to the stack.

Referring to FIG. 8B, the first four fields in the CCB3 command control block are similar to those for a CCB1 command control block. The fifth field, CCB_POINTER, is used by the queue pointer and LAN adapter device drivers.

The sixth field is used to store the offset of the user APPENDAGE for a given application programs device driver. The seventh field CCB_PARM_OFFSET points to additional parameter commands specific parameters. The eighth field contains another 2-bytes of parameter data. The CCB_RESOURCE_ID field is used when more than one OS/2 application is running and used to clear the resources associated with an application when it terminates. The CCB_APPL_ID field contains the ID of the application program which issued the CCB3 command. The CCB_APPL_KEY field contains a key code to provide resource security for application programs. The last field, the CCB_Parameter2 contains two bytes of parameter data which is usually the system key parameter.

Service access points (SAP) provided means of communication with devices connected to the network. A given application program may open several SAPs for an adapter and each SAP can have several link stations opened.

While the invention has been described with respective to particular embodiments above it be understood by those skill in the art that modifications may be made without departing from the spirit and scope of the present invention. These embodiments are for the purposes of example and illustration only and are not be taken to limit the scope of the invention narrower than the scope of the appended claims.

We claim:

1. In a computer system coupled to a computer network, a method for transmitting a message from at least one process resident in a memory of the computer system over a network adapter to the network, comprising the steps of:

running a first process in a virtual machine in a first operating system, the first process originally written for a second operating system;

intercepting a message from the first process by means of a virtual device driver resident in the memory;

converting the message from a format written for the second operating system to a format written for the first operating system in the virtual device driver;

converting the message in the format for the first operating system to a format written for a logical link control protocol driver in a physical device driver;

transmitting the message by a second logical link control protocol driver to the network adapter transmitting a message from the network via the network adapter to the first process resident in a system memory;

transmitting a second message from a logical link protocol driver to the physical device driver, the second message in the format for a logical link protocol driver;

converting the second message from the format for the logical link protocol driver to the format for the first operating system in the physical device driver;

converting the second message in the format for the first operating system to the format for the second operating system in the virtual device driver;

determining that the first process has sufficient memory allocated to receive the second message; and in response to the determination that the first process has sufficient memory allocated, transmitting the second message to the first process.

2. The method as described in claim 1 further comprising the steps of:

storing messages in the format for the first operating system in a first buffer and messages in the format for the second operating system in a second buffer, wherein the virtual device driver controls the first and the second buffer within the memory.

3. The method as recited in claim 1 wherein the logical link control protocol driver is coupled to the network adapter by means of a medium access control driver.

4. The method as recited in claim 3 further comprising the steps of:

running a second process in the first operating system, the second process written for the first operating system;

sending a third message from the second process to the physical device driver, the third message in the format for the first operating system;

converting the third message in the format for the first operating system to a format written for a logical link control protocol driver in the physical device driver; and transmitting the third message by the logical link control protocol driver to the network adapter, wherein the second and first processes both communicate to the network via the same physical device driver, logical link control protocol driver and network adapter.

5. The method as recited in claim 1, comprising the steps of:

running a second process in a virtual machine in a first operating system, the second process originally written for a second operating system;

intercepting a message from the second process by means of a virtual device driver resident in the memory;

converting the message from a format written for the second operating system to a format written for the first operating system in the virtual device driver;

converting the message in the format for the first operating system to a format written for a logical link control protocol driver in a physical device driver; and transmitting the message by a logical link control protocol driver to the network, wherein the first and second processes both communicate to the network via the same physical device driver, logical link control protocol driver and network adapter.

6. A computer system for transmitting a message from at least one process resident in a memory of the computer system to a computer network, the computer system including a processor and network adapter and comprising:

a virtual machine for running a first process in a first operating system, the first process originally written for a second operating system;

a virtual device driver for intercepting messages from the first process and for converting messages between a format written for the second operating system and a format written for the first operating system;

a physical device driver for converting messages between the format for the first operating system and a format written for a logical link control protocol driver;

a logical link control protocol driver for transmitting the message to the network adapter;

a network adapter for transmitting and receiving messages from the network;

means for determining that the first process has sufficient memory allocated to receive a first message; and means responsive to the determination that the first process has sufficient memory allocated for transmitting the first message to the first process.

7. The system as described in claim 6 further comprising:

a first buffer for storing messages in the format for the first operating system; and a second buffer for storing messages in the format for the second operating system;

wherein the virtual device driver controls the first and the second buffers within the computer system.

8. The system as recited in claim 6 wherein the logical link control device driver is coupled to a network adapter by means of medium access control driver.

9. The system as recited in claim 8 further comprising:

a second process running in the first operating system, the second process written for the first operating system;

means for sending messages from the second process to the physical device driver in the format for the first operating system; and wherein the second and first processes both communicate to the network via the same physical device driver, logical link control protocol driver and network adapter.

10. The system as recited in claim 6, further comprising:

a second process running in a virtual machine in the first operating system, the second process originally written for the second operating system; and wherein the first and second processes both communicate to the network via the same virtual device driver, physical device driver, logical link control protocol driver and network adapter.

11. A computer program product resident on a computer readable memory for transmitting messages between a at least one process running in a virtual machine of a first operating system in a memory of the computer system and a computer network via a network adapter, a first process in the virtual machine originally written for a second operating system, the product comprising:

means for intercepting messages from the first process routing the intercepted messages to a virtual device driver resident in the memory;

means for converting messages between a format written for the second operating system and a format written for the first operating system in the virtual device driver;

means for converting messages between the format for the first operating system and a format written for a logical link control protocol driver in a physical device driver;

means for transmitting messages between a logical link control protocol driver and the network via the network adapter;

means for determining that the first process has sufficient memory allocated to receive a first message; and means responsive to the determination that the first process has sufficient memory allocated for transmitting the first message to the first process.

12. The product as described in claim 11 further comprising:

means for storing messages in the format for the first operating system in a first buffer and messages in the format for the second operating system in a second buffer; and means for the virtual device driver to control the first and the second buffers within the memory.

13. The product as recited in claim 11 wherein a second process is running in the first operating system, the second process written for the first operating system, the product further comprising:

means for sending messages in the format for the first operating system between the second process and the physical device driver;

means for converting messages between the second process and the physical device driver between the format for the first operating system and a format written for a logical link control protocol driver in the physical device driver; and means for transmitting messages between the logical link control protocol driver and the network adapter, wherein the second and first processes both communicate to the network via the same physical device driver, logical link control protocol driver and network adapter.

14. The product as recited in claim 11, wherein a second process is run in a second virtual machine in the first operating system, the second process originally written for a second operating system; comprising:

means for intercepting messages from the second process routing the intercepted messages to the virtual device driver resident in the memory;

wherein the first and second processes both communicate to the network via the same physical device driver, logical link control protocol driver and network adapter.

15. In a computer system running a first operating system which runs processes written for a second operating system in at least one virtual machine, a method for allowing multiple processes written for the first and the second operating system to share a network adapter coupling the computer system to a computer network, the method comprising:

intercepting messages from a first process written for a second operating system running in a virtual machine routing the intercepted messages to a virtual device driver resident in the memory;

determining that the first process has sufficient memory allocated to receive messages before transmitting messages from the network to the first process;

converting messages between a format written for the second operating system and a format written for the first operating system in the virtual device driver;

sending messages in the format for the first operating system between a second process written for the first operating system and the physical device driver;

converting messages between the format for the first operating system and a format written for a logical link control protocol driver in the physical device driver; and transmitting messages between a logical link control protocol driver and the network, wherein the second and first processes both communicate to the network via the same physical device driver, logical link control protocol driver and network adapter.

16. The method as recited in claim 15, wherein a third process is run in a second virtual machine in the first operating system, the third process originally written for a second operating system, further comprising the steps of:

intercepting messages from the third process routing the intercepted messages to the virtual device driver resident in the memory;

wherein the first and third processes both communicate to the network via the same physical device driver, logical link control protocol driver and network adapter.

* * * * *